United States Patent [19]

Morgan, Jr.

[11] 4,133,769

[45] Jan. 9, 1979

[54] LIQUID FILTER HAVING SELF-RETAINING FILTER BAG

[75] Inventor: Howard W. Morgan, Jr., Michigan City, Ind.

[73] Assignee: Filter Specialists, Inc., Michigan City, Ind.

[21] Appl. No.: 854,482

[22] Filed: Nov. 25, 1977

[51] Int. Cl.² .............................................. B01D 29/30
[52] U.S. Cl. .................................... 210/455; 210/477; 55/378; 55/502
[58] Field of Search ................ 210/455, 480, 473–474, 210/477, 479; 55/361, 378, 500, 502; 209/399, 403, 405; 220/85 B

[56] References Cited

U.S. PATENT DOCUMENTS

| | | | |
|---|---|---|---|
| 732,659 | 6/1903 | Scott | 210/477 |
| 2,191,395 | 2/1940 | Moser | 210/474 |
| 3,651,947 | 3/1972 | Scholhamer | 210/474 |
| 3,931,015 | 1/1976 | Jenkins | 210/232 |
| 3,935,112 | 1/1976 | Greutert | 210/474 |
| 3,959,137 | 5/1976 | Kirsgalvis | 210/474 |
| 4,053,393 | 10/1977 | Day et al. | 209/211 |
| 4,081,379 | 3/1978 | Smith | 210/455 |

FOREIGN PATENT DOCUMENTS 242082  11/1925  United Kingdom ..................... 210/473

Primary Examiner—William A. Cuchlinski, Jr.
Assistant Examiner—Jon E. Hokanson
Attorney, Agent, or Firm—Oltsch, Knoblock & Hall

[57] ABSTRACT

A liquid filter having a housing which includes a chamber enclosed by a cap. A reticulated basket is fitted within the housing chamber and supported by the housing. A filter bag is positioned within the reticulated basket and includes a flexible flange which engages the housing to secure the bag within the basket without the aid of the filter cap.

14 Claims, 9 Drawing Figures

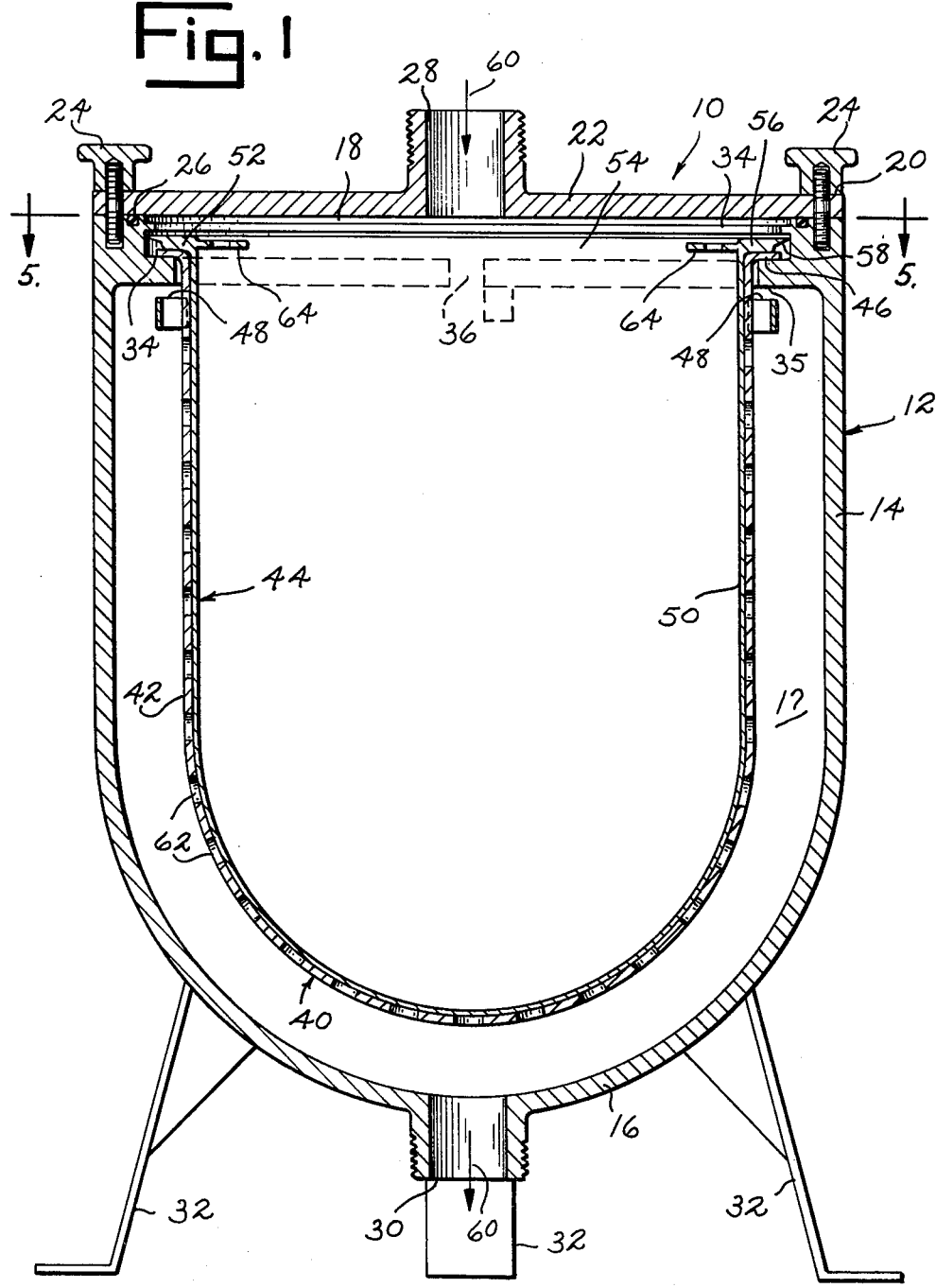
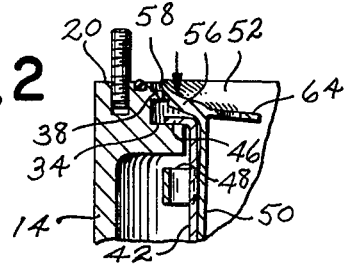
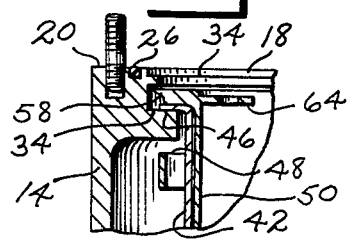
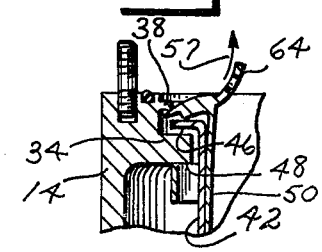

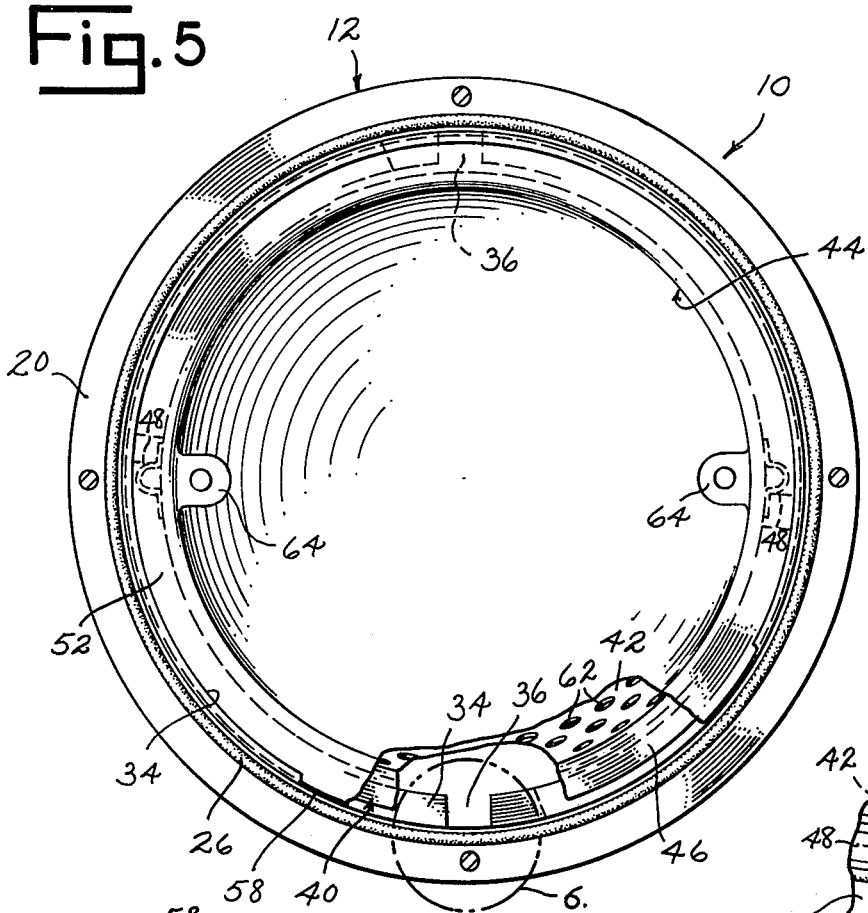
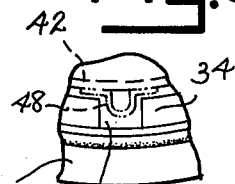
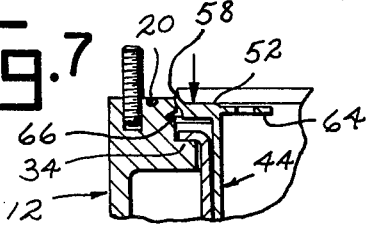
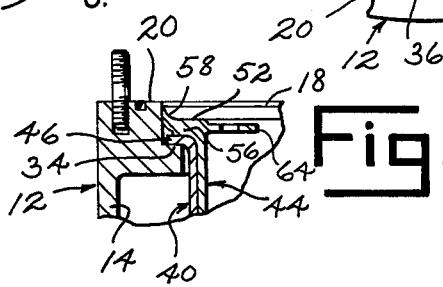
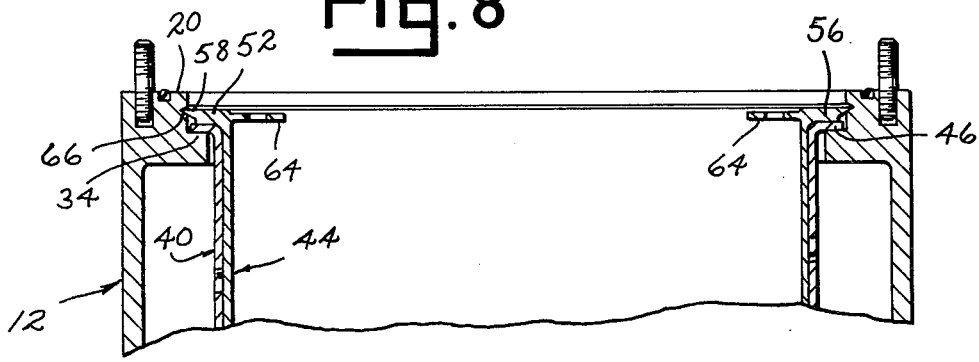

LIQUID FILTER HAVING SELF-RETAINING FILTER BAG

SUMMARY OF THE INVENTION

This invention relates to a filter having an improved self-retaining filter bag.

The filter of this invention includes a housing having a side wall which defines a chamber. An opening into the chamber is formed in the housing. A cap spans the chamber opening. A reticulated basket is fitted within the housing chamber and is supported at its marginal edge by the housing. A filter bag having an outturned flange at its opening is fitted into the basket with the flange thereof overlying the marginal edge of the basket and engaging the housing in such a manner so as to secure the bag in position within the basket. By designing the filter bag so that it is independently securable to the housing, the filter cap need not be designed to contact the bag when connected to the housing. Additionally, the bag serves as a hold-down or retainer for the reticulated basket with its flange making sealing contact with the filter housing so that substantially all liquid entering the filter must pass through the bag before it leaves the filter.

The reticulated filter basket is provided with stops which enable the basket to be interlocked with the filter housing. Thus, when the filter bag is removed from the filter, such as when it becomes necessary to clean or change bags during use, the reticulated basket will remain within the housing upon withdrawal of the bag. This enables the filter bag to be more easily and quickly cleaned or changed and relieves the user of having to reposition the basket after each exchange of filter bags.

Accordingly, it is an object of this invention to provide a liquid filter having an impoved filter bag.

Another object of this invention is to provide a liquid filter having a reticulated basket into which a filter bag is fitted and independently retained by engagement with the filter housing.

Another object of this invention is to provide a liquid filter having a filter bag which fits into a reticulated basket supported by the filter housing and which serves to position the basket within the housing.

Still another object of this invention is to provide a liquid filter having a filter bag which can be simply removed and cleaned or replaced.

Still another object of this invention is to provide a liquid filter having a combination reticulated basket and filter bag in which the basket is removably interlocked with the filter housing.

Other objects of this invention will become apparent upon a reading of the invention's description.

BRIEF DESCRIPTION OF THE DRAWINGS

FIG. 1 illustrates one embodiment of this invention with the filter shown in vertical sectional form.

FIG. 2 is a fragmentary sectional view showing the filter bag of FIG. 1 being inserted into the filter housing.

FIG. 3 is a fragmentary sectional view showing the filter bag of FIG. 1 seated in the filter housing.

FIG. 4 is a fragmentary sectional view showing the filter of FIG. 1 being removed from the filter housing.

FIG. 5 is a cross sectional view of the filter taken along line 5—5 of FIG. 1 with portions of the filter bag and reticulated basket broken away for purposes of illustration.

FIG. 6 is a view of that portion of FIG. 5 enclosed within broken line circle 6 showing the reticulated basket of the filter in broken lines in proper position to be removed from the filter housing.

FIG. 7 is a fragmentary sectional view of a modified embodiment of the filter showing a filter bag being fitted into the filter housing.

FIG. 8 is a fragmentary sectional view showing the filter embodiment of FIG. 7 with the filter bag seated therein.

FIG. 9 is a fragmentary sectional view showing still another embodiment of the filter with the filter bag seated in the filter housing.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Filter 10, shown in FIGS. 1–6, includes a housing 12 having a side wall 14 and a bottom wall 16 defining an internal chamber 17. An opening 18 defined by side wall end edge 20 into chamber 17 is formed in housing 12 and is oppositely located from bottom wall 16 of the housing. A cap 22 spans opening 18 in housing 12. Cap 22 rests upon side wall end edge 20 and is retained in position by a plurality of removable threaded hold-down members 24. An O-ring 26 is placed in compression between cap 22 and housing 12 so as to provide a liquid seal between the cap and housing.

Cap 22 includes an inlet port 28 and bottom wall 16 of housing 12 includes an outlet port 30 by which liquid can flow through filter 10. Legs 32 are connected to housing bottom wall 16 for the purpose of maintaining filter 10 in an upright position during use. Filter 10 thus far described is of a standard, commercially available construction.

Housing side wall 14 carries an annular shoulder 34 which is inset or spaced from end edge 20 of the housing. Shoulder 34 is interrupted at two diametrically spaced locations by slots 36. An annular flange 38 is also carried by side wall 14 of the housing. Flange 38 is spaced from shoulder 34 and is located between the shoulder and end edge 20 of housing 12.

A basket 40 having a reticulated wall 42 is fitted within housing 12. Basket 40 is for the purpose of supporting a filter bag 44 and thus is formed of a rigid shape-retaining construction. An outturned annular flange 46 is formed at the opening into basket 40. The outer diameter of basket flange 46 exceeds the inner diameter of housing shoulder 34, but is less than the inner diameter of housing flange 38 to permit the basket to be removably inserted into the housing through its opening 18, with flange 46 overlying and resting upon shoulder 34. A pair of diametrically located stops 48 are connected to basket wall 42 in a spaced relationship below basket flange 46. Stops 48 are sized so as to pass with clearance through slots 36 in housing shoulder 34 as seen in broken lines in FIG. 6 when the basket is being first inserted into the housing. Once stops 48 have passed through slots 36 and are located below the inner edge 35 of shoulder 34, the basket can be rotated relative to housing 12 to cause the stops to be positioned under an uninterrupted portion of the shoulder, as illustrated in FIGS. 1 and 5. The spacing between stops 48 and overlying basket flange 46 slightly exceeds the thickness of housing shoulder 34 so that when the stops are positioned under an uninterrupted porton of shoulder 34, basket 40 will be prevented from being withdrawn any appreciable distance from the filter housing.

Filter bag 44 includes a wall part 50 which is formed of a flexible, liquid previous material, such as interwoven nylon, cotton or wool, and a ring part 52 which is formed of a flexible shape-retaining material, such as nylon or polypropylene. Ring part 52 defines the opening 54 into bag 44 and is attached to wall part 50, such as by sewing or heat sealing. Bag ring part 52 includes an outturned flange 56 which terminates into a tapering lip 58. The diameter across the opening 54 into bag 44 as measured diametrically across the outer edge of lip 58 just slightly exceeds the inner diameter of side wall 14 of the filter housing as measured above housing shoulder 34 between the shoulder and overlying flange 38.

With filter cap 22 removed and basket 40 supported upon shoulder 34 at its flange 46, bag 44 is inserted into the basket with lip 58 of the bag being flexed first upwardly and then around protruding flange 38 of the housing, as illustrated in FIGS. 2 and 3. Flange 56 of bag 44 fits between flange 38 and shoulder 46 of basket 40 with the outer edge of lip 58 of the flange making peripheral liquid sealing contact with side wall 14 of the housing. Liquid flow as indicated by arrows 60 in FIG. 1 will cause flange 56 of bag 44 to press downwardly against flange 46 of basket 40, thereby firmly positioning the basket within housing 12 so that the liquid first enters the interior of bag 44 from filter inlet port 28 and thereafter passes through previous filtering wall part 50 of the bag and openings 62 in basket 40 and out outlet port 30.

Ring part 52 of bag 44 includes a pair of tabs 64 which are integrally formed to flange 56 of the bag. Tabs 64 when pulled outwardly as shown by arrow 57 in FIG. 4 with cap 22 removed from the filter cause flange 56 to be flexed and cammed inwardly and pulled from engagement with housing flange 38 to release the bag from the filter for purpose of replacement or cleaning. Wall part 50 of the bag will usually adhere to basket 40 during initial efforts to remove it from the filter. This bag-basket adherence causes the basket to move toward opening 18 in housing 12 until basket stops 48 engage the inner edge 35 of housing shoulder 34 where further outward movement of the basket is prevented as bag 44 is pulled from the basket.

In FIGS. 7 and 8 a modified form of the filter shown in FIGS. 1–6 is illustrated. In this embodiment, housing 12 is modified by the elimination of flange 38 and the introduction of an annular interior groove 66 between shoulder 34 and end edge 20 of the housing. The diameter of housing side wall 14 at the place of maximum depth of groove 66 is slightly less than the outer diameter of bag 44 as measured across the outer edge of its lip 58. Ring part 52 of bag 44 is wedged into housing 16 with lip 58 being flexed outwardly, as seen in FIG. 7, until groove 66 of the housing is reached. Lip 58 then springs into groove 66 to interlock the bag with the filter housing, as seen in FIG. 8, with flange 56 of the bag overlying and preferably contacting basket flange 46. In this embodiment, the compressive fit of bag lip 58 into housing groove 66 forms a liquid seal between the bag and the housing. The operation of the filter in the embodiment shown in FIGS. 7 and 8 is similar to the operation of the embodiment illustrated in FIGS. 1–6. Bag 44 shown in FIGS. 7 and 8 can be removed from basket 40 by an outward pull upon tabs 64.

In FIG. 9 another embodiment of this invention is illustrated. In this embodiment side wall 14 of housing 12 is provided with a straight internal surface between shoulders 34 and end edge 20. The inner diameter of side wall 14 between shoulder 34 and end edge 20 is less than the outer diameter of bag lip 58. Ring part 52 of bag 44 is wedged into housing 12 with lip 58 contacting housing side wall 14 above shoulder 34. This wedge fit between bag 44 and housing 12 not only forms an annular peripheral liquid seal between lip 58 of the bag and side wall 14 of housing 12, but also causes flange 56 of the bag to overlie and preferably contact outturned flange 46 of basket 40 to urge the basket into contact with housing shoulder 34. When cap 22 of the filter has been secured to housing 12 over its opening 18, liquid flow through the filter will cause pressure to be brought against the outer surface of bag lip 58 to enhance the seal between the lip and side wall 14 of filter housing 12. Bag 44 in the embodiment shown in FIG. 9 can be removed with an upwardly pull upon tabs 64 of bag 44.

In some embodiments of this invention the filer could be designed so that both the inlet and outlet ports of the filter are incorporated into the filter housing and not the filter cap. Further, it is to be understood that this invention is not to be limited to the details above given and described, but may be modified within the scope of the appended claims.

What I claim is:

1. In a liquid filter including a housing having a side wall defining a chamber therein, said chamber having an opening, a cap spanning said chamber opening, a support carried by said housing, a reticulated basket having an opening therein defined by a marginal edge, said basket fitted within said chamber with its marginal edge contacting said support to space said basket from said housing side wall, an inlet port and an outlet port located in liquid flow communication through said basket, the improvement comprising a filter bag having an opening therein defined by a shape-retaining edge portion, said bag opening edge portion including a flexible outturned flange means, said bag fitting in said basket through said basket opening within the path of liquid flow communication between said inlet and outlet ports, said bag having its opening edge portion overlying said basket marginal edge, said bag flange means engaging said housing to secure said bag in position within said basket independently of said cap.

2. The filter of claim 1 wherein said support is an annular shoulder protruding from said housing side wall into said chamber, said bag flange means constituting an annular flange located over said housing shoulder.

3. The liquid filter of claim 2 wherein said bag flange peripherally contacts said housing about its side wall to form a liquid seal between the housing and bag at its said edge portion whereby substantially all liquid entering said housing chamber through said inlet port will pass through said bag before exiting said chamber through said outlet port.

4. The liquid filter of claim 3 wherein said bag flange in contacting said housing side wall is flexed toward said chamber opening.

5. The liquid filter of claim 4 wherein said bag flange terminates in a tapering lip positioned against said housing side wall.

6. The liquid filter of claim 4 wherein said bag flange contacts said underlying basket marginal edge to urge said basket marginal edge against said housing shoulder.

7. The liquid filter of claim 2 wherein said housing includes flange means located spacedly from said housing shoulder between the shoulder and said chamber opening, said bag flange positioned under said housing flange means and restrictively between the housing flange means and underlying basket marginal edge.

8. The liquid filter of claim 7 wherein said bag flange peripherally contacts said housing about its side wall to form a liquid seal between the housing and bag at its said edge portion whereby substantially all liquid entering said housing chamber through said inlet port will pass through said bag before exiting the chamber through said outlet port.

9. The liquid filter of claim 2 wherein said housing includes an annular groove formed in its side wall spaced from said housing shoulder between the shoulder and said chamber opening, said bag flange protruding into said groove.

10. The liquid filter of claim 6 wherein said bag flange peripherally contacts said housing about its side wall within said groove to form a liquid seal between the housing and bag at its said edge portion whereby substantially all liquid entering said housing chamber through said inlet port will pass through said bag before exiting said chamber through said outlet port.

11. The liquid filter of claim 2 and grip means extending from said bag edge portion for enabling said bag to be removed from said basket.

12. The liquid filter of claim 11 wherein said grip means is tab means projecting laterally into the opening of said bag in alignment with said bag flange for providing release pivotal movement of the flange from engagement with said housing.

13. The liquid filter of claim 2 wherein said housing shoulder has opening means formed therein, said basket including a side terminating in said marginal edge, stop means protruding exteriorly from said basket side in a spaced relationship from said marginal edge, said stop means located adjacently under said housing shoulder to prevent said basket from being removed from said housing, said opening means for accommodating said stop means as said basket is first fitted into said housing and then rotated relative to the housing to position said stop means under said housing shoulder with said basket marginal edge contacting said housing shoulder.

14. In a liquid filter including a housing having a side wall defining a chamber therein, said chamber having an opening therein, a cap spanning said chamber opening, an annular shoulder carried by said housing side wall and extending into the housing chamber, said shoulder having opening means formed therein, a reticulated basket having an opening therein defined by a marginal edge, said basket removably fitted within said housing chamber with its said marginal edge contacting said housing shoulder to space said basket from said housing side wall, said basket including a side, stop means protruding exteriorly of said basket side in a spaced relationship from said basket marginal edge, said stop means located adjacently under said housing shoulder, a filter bag having a shape retaining edge portion, said bag fitting removably within said basket through said basket opening and having said edge portion overlying said basket marginal edge, said basket stop means for contacting said housing shoulder to prevent removal of said basket from said housing when said bag is removed from said basket for cleaning or replacement, said shoulder opening means for accomodating said stop means as said basket is first fitted into said housing and then rotated to position said stop means adjacently under said housing shoulder with said basket marginal edge contacting said shoulder, an inlet port and an outlet port located in liquid flow communication through said basket and bag.

* * * * *